United States Patent [19]
Dockser

[11] Patent Number: 5,841,684
[45] Date of Patent: Nov. 24, 1998

[54] METHOD AND APPARATUS FOR COMPUTER IMPLEMENTED CONSTANT MULTIPLICATION WITH MULTIPLIERS HAVING REPEATED PATTERNS INCLUDING SHIFTING OF REPLICAS AND PATTERNS HAVING AT LEAST TWO DIGIT POSITIONS WITH NON-ZERO VALUES

[75] Inventor: Kenneth A. Dockser, San Jose, Calif.

[73] Assignee: VLSI Technology, Inc., San Jose, Calif.

[21] Appl. No.: 789,151

[22] Filed: Jan. 24, 1997

[51] Int. Cl.⁶ ........................................ G06F 7/52
[52] U.S. Cl. ............... 364/757; 364/488; 364/754.01; 364/736.01; 364/748.09; 364/750.05; 364/736.03; 364/606; 364/703; 364/715.09
[58] Field of Search ............... 364/757, 736.03, 364/748.09, 754.01, 715.09, 489, 488, 606, 703, 736.01

[56] References Cited

U.S. PATENT DOCUMENTS

| | | | |
|---|---|---|---|
| 4,276,607 | 6/1981 | Wong | 364/757 |
| 4,573,136 | 2/1986 | Rossiter | 364/757 |
| 4,718,031 | 1/1988 | Nukiyama | 364/757 |
| 5,117,385 | 5/1992 | Gee | 364/757 |
| 5,142,490 | 8/1992 | Tsujihashi et al. | 364/757 |
| 5,255,216 | 10/1993 | Blanz et al. | 364/757 |
| 5,262,976 | 11/1993 | Young et al. | 364/760 |
| 5,313,414 | 5/1994 | Yang et al. | 364/757 |
| 5,343,416 | 8/1994 | Eisig et al. | 364/757 |
| 5,424,971 | 6/1995 | Yang et al. | 364/757 |
| 5,436,860 | 7/1995 | Shankar et al. | 364/757 |
| 5,574,672 | 11/1996 | Briggs | 364/757 |
| 5,579,527 | 11/1996 | Chin et al. | 364/757 |
| 5,586,069 | 12/1996 | Dockser | 364/757 |
| 5,600,569 | 2/1997 | Nishiyama et al. | 364/757 |
| 5,617,346 | 4/1997 | Inoue | 364/757 |
| 5,642,306 | 6/1997 | Mennemeier et al. | 364/757 |

OTHER PUBLICATIONS

Koren, Israel, *Computer Arithmetic Algorithms*, Prentice–Hall, Inc., Englewood Cliffs, N.J., 1993, pp. 99–111.

*Primary Examiner*—Parshotam S. Lall
*Assistant Examiner*—William D. Thomson
*Attorney, Agent, or Firm*—Clifton L. Anderson

[57] ABSTRACT

A method for designing a constant multiplier system comprises identifying a repeated pattern in a minimal signed digit expression of a multiplier, designing a first accumulator stage to compute the product of a multiplicand by an instance of the pattern, and designing a second accumulator stage for accumulating shifted replicas of the pattern to yield a final product. Remainder terms, for example corresponding to non-zero digit positions not included in any instance of the pattern, are also accumulated at the second stage. By limiting the method to patterns with at least two non-zero values, the result tends to reduce the number of operations that must be performed to determine a final product. Thus, the size, complexity and speed of a constant multiplier system can be optimized.

9 Claims, 3 Drawing Sheets

METHOD AND APPARATUS FOR COMPUTER IMPLEMENTED CONSTANT MULTIPLICATION WITH MULTIPLIERS HAVING REPEATED PATTERNS INCLUDING SHIFTING OF REPLICAS AND PATTERNS HAVING AT LEAST TWO DIGIT POSITIONS WITH NON-ZERO VALUES

BACKGROUND OF THE INVENTION

The present invention relates to data processing and, more particularly, to computer-implemented multiplication. A major objective of the present invention is to enhance data processing throughput by streamlining multiplication by certain constant multipliers.

Computers, broadly defined to include computational electronic devices, have changed our society by automating formerly labor intensive tasks and by making practical many tasks that heretofore were impracticable. While general purpose computers have achieved the greatest visibility, special purpose computers such as embedded controllers (e.g., in automobiles and cameras) and digital signal processors (e.g., in digital audio/visual equipment) have become even more ubiquitous. However, no sooner do computers meet some need then appetites are whetted for further capabilities, e.g., collaborative video over phones connected to the Internet.

Computers achieve their prowess largely by executing large numbers of relatively simple tasks at high speed. Complex computational tasks are reduced to basic logico-mathematical constituents. Even basic arithmetic operations are simplified further. Computations are performed in binary format, in which numbers are expressed as strings with only two values—0 and 1, minimizing the number of combinations that must be considered for each operation.

Multiplication benefits from this binary format. Multiplication, involves the generation of partial products and the accumulation of the partial products. When the multiplicand and multiplier are in binary format, all partial products are either 0 or a shifted replica of the multiplicand. The partial products can then be added-with-carry pair-wise one bit position at a time so that only eight combinations (2 for the first addend ×2 for the second added ×2 for the carry) of addends and carry need be considered instead of the two hundred (10×10×2) possible combinations for digit-by-digit pair-wise addition-with-carry of decimal numbers. While a given binary multiplication can involve thousands of bit-sized operations, computers can perform up to millions of such operations per second so that computational throughput can be impressive.

Greater computational throughput in the future is virtually assured through the development of faster computers. However, within any given generation of hardware, there is still a need to optimize multiplication throughput, reduce circuit size, or both. One approach to increasing throughput and reduce size is to streamline multiplication by minimizing the number of partial products that must be generated and thus the number of simple arithmetic operations that must be performed for a given multiplier. Such methods are particularly useful for designing hardware dedicated to multiplying by a predetermined constant multiplier. However, the methods employed function well in software implementations as well.

In a "zero-omission" method of reducing the number of partial products, 0s in the multiplier are located and the corresponding partial products are not generated or accumulated. An example of this approach is provided in U.S. Pat. No. 5,424,971 to Yang et al. The effectiveness of the zero-omission method depends on the multiplier. The best case is a multiplier with only 0s, in which case no partial products are generated or accumulated. The effectiveness of the zero-omission method decreases with an increasing percentages of 1s in the multiplier. In the worst case of a multiplier with all 1s, the zero-omission method affords no reduction of partial products.

In many cases, further reductions in the number of partial products can be achieved where partial products can be subtracted as well as added. For example, the multiplier 111100 requires four partial products if only addition is employed. However, as indicated by the equivalence $111100=2^6-2^2$, only two partial products and thus one simple arithmetic operation (i.e., addition, subtraction) are required if subtraction is allowed.

If a binary-coded number is re-expressed in signed-digit code, the associated number of partial products is readily determined. In addition to values of 0 and 1, signed digit notation permits values of −1, typically written as $\bar{1}$ to be used at any digit position. Thus, binary 111100 equals signed digit $100\bar{1}00$. It is clear from this expression that two partial products are required and that the partial product corresponding to the third least significant digit position is to be subtracted from the partial product corresponding to the most significant digit position.

There can be many alternative signed digit expressions of a number. The one with the fewest digit positions with non-zero values corresponds to the least number of partial products. Canonical recoding yields a "minimum signed digit code", i.e., a signed digit expression with the smallest possible number of non-zero values. Thus, it has been proposed that a canonically recoded expression of a multiplier corresponds to the least number of add/subtract operations required for accumulating partial products generated by that multiplier. (See *Computer Arithmetic Algorithms* by Israel Cohen, Prentice-Hall, Inc., Englewood Cliffs, N.J., 1993, pp. 103–104). However, there are cases in which further reductions in the number of simple arithmetic operations can be achieved. The resulting increase in computation speed and/or reductions in circuitry can be significant in constant multiplier applications.

SUMMARY OF THE INVENTION

The present invention provides a constant multiplier system and a constant multiplier compiler for designing the system. The compiler identifies repeated patterns in an expression of the multiplier. The patterns of interest include at least two digit positions with non-zero values. Preferably, the expression is in a minimal signed digit format, but need not be. The compiler then describes a constant multiplier system with an input for receiving a multiplicand, a pattern-product accumulator, and a final-product accumulator. By removing redundant operations, the invention reduces the number of operations required to yield the product of a multiplicand and certain multipliers.

The system can be a "hardwired" circuit or a temporary structure set up in accordance with computer program instructions. The pattern-product accumulator is coupled to the input to receive the multiplicand. The pattern product accumulator generates a "pattern-multiplicand" replica of the multiplicand for each non-zero value in the pattern. The replicas are shifted relative to each other in accordance with the digit positions of the respective non-zero values in the pattern. The result of the accumulation is a "pattern" product of the multiplicand by the pattern.

The final-product accumulator accumulates a set of partial products to yield the "final" product of the multiplier and the multiplicand. The final-product accumulator is coupled to the pattern-product accumulator for receiving the pattern product therefrom. The final-product accumulator generates as many "pattern-product" replicas of the pattern product as there are instances of the pattern. The pattern-product replicas are shifted relative to each other in accordance with the respective pattern instances in the multiplier. The pattern-product replicas constitute some or all of the set of partial products accumulated by the final-product accumulator to yield the product of multiplicand and multiplier.

If each non-zero value in the multiplier is included in exactly one instance of the pattern, then the pattern-product replicas constitute the entire set of partial products. If there is a non-zero value in the multiplier not included in any instance of the pattern, then an "exclusion" remainder must be included in the final product accumulation. If there is a non-zero value included in two overlapping instances of the pattern, then an "overlap" remainder is required in the final product accumulation. More generally, any non-zero values in the difference remaining after each pattern instance is subtracted from the multiplier results in a remainder that must be taken into account in the final accumulation.

Accordingly, the final-product accumulator can be coupled to the input for receiving the multiplicand. If there is more than one non-zero remainder value, multiple "remainder-multiplicand" replicas of the multiplicand are shifted relative to each other in accordance with the respective non-zero values in the difference, and are accumulated along with the pattern-product replicas.

The present invention requires patterns that include at least two digit positions with non-zero values. Any such pattern can be reduced to a pattern that begins and ends with non-zero values. The invention does not provide an advantage for patterns with no non-zero values (all zeroes) or for patterns with only one non-zero value. On the other hand, the invention does not require that the patterns be contiguous. For example, in the multiplier 11010001001, the non-contiguous pattern 1-01 is repeated. The 1 at the second most significant position becomes a remainder.

The invention also provides for a wide variety of pattern instance types. Both inverted and non-inverted instances are provided for. In the multiplier 10$\bar{1}$000$\bar{1}$01, the less significant instance of the pattern 10$\bar{1}$ is inverted relative to the more significant instance of the pattern. However, in the multiplier 10$\bar{1}$00010$\bar{1}$, the two instances are not inverted with respect to each other. The inverted status is taken into account either in the signs of the respective pattern-product replicas or in the selection of addition or subtraction to effect their accumulation.

Both overlapping and non-overlapping instances are provided for. For example, in the multiplier 11010001101, the instances of the pattern 1101 are non-overlapping. However, in the multiplier 1101101, two instances of the pattern 1101 are overlapping. Specifically, the fourth-most significant digit is shared by both instances of the pattern. When both instances of the pattern are subtracted from the multiplier, the result is 000$\bar{1}$000, indicating an overlap-type remainder. In this case, a "remainder-multiplicand" replica is to be subtracted from other partial products in the final-product accumulation.

The invention requires at least two complete instances of a pattern. However, the invention provides for additional instances which are incomplete. For example, in the multiplier 110100011010001100, there are two complete instances of the pattern 1101. However, the final 1100 can be treated as a partial third instance. Subtracting three complete instances of 1101 from the multiplier yields 00000000000000$\bar{1}$. This indicates a partial-pattern-type remainder to be taken into account in the final product accumulation.

The invention also provides for multiple patterns and for patterns within patterns. In the case of multiple patterns, the pattern-product accumulator has one section for each pattern; each section provides a respective pattern-product for replication and accumulation by the final-product accumulator. In the case of patterns within patterns, i.e., subpatterns, the pattern-product accumulator can have substages in which subpattern-products are generated by one substage and accumulated by the next.

A main advantage of the invention is that it affords a reduction in the number of operations (e.g., additions and subtractions) that must be performed. One of the challenges of the invention is to find the optimal patterns. In a pattern matching approach, each single instance of a pattern is shifted over the length of a multiplier to find matching instances. In some cases, the number of possible patterns and matches can be overwhelming. However, the search can exclude patterns which, even if repeated, would not result in a reduction in the number of operations. Furthermore, searches can be prioritized so that easier patterns, e.g., contiguous, are searched first; more difficult patterns can be searched if the easier search fails and if the potential benefits justify the extra time and effort.

Factoring is an alternative approach to identifying a repeated pattern. A multiplier can be factored in all possible ways. Each factor can be compared with the unfactored multiplier for operation reductions. If the result of the first-level of search does not exclude the possibility of a better solution, a second-level of search can be conducted.

In the second level search, all numbers differing from the multiplier at only digit position are considered. For each of these numbers, all possible factorings are considered and checked for reductions in operation count. Thus, while 11001101=409 is not factorable (i.e., it is a prime number), 11001100=408=3×136 is factorable; this factoring identifies the pattern 11 and a remainder at the least significant bit position. If the second-level search does not exclude the possibility of a better solution, a third-level search considers all numbers differing from the multiplier in two digit positions.

Clearly, processing requirements expand dramatically at each increase in level. However, at each level, it is possible to limit the search by considering the requirement that the operation count be reduced. An optimal operation reduction found at any level extinguishes the search. A non-optimal operation reduction at any level can greatly reduce the extent of the search at the next level. At some point, it will be clear that there are no better solutions at the next level, so the search can stop. The pattern-search and the factoring methods differ in effort required to find respective types of repeated patterns. The approaches can be combined at some cost in search complexity to obtain the advantages of each.

Either method or the combined method can be used in a non-exhaustive manner. For example, pattern shifting can be restricted to contiguous patterns. In that case, some optimal solutions may be missed. Yet, in many cases, operation reductions will result. Where they do result, savings in computation time, integrated circuit area (or program code), and complexity can result. These and other features and advantages of the invention are apparent from the description below with reference to the following drawings.

DESCRIPTION OF THE PREFERRED EMBODIMENTS

Figure 1:
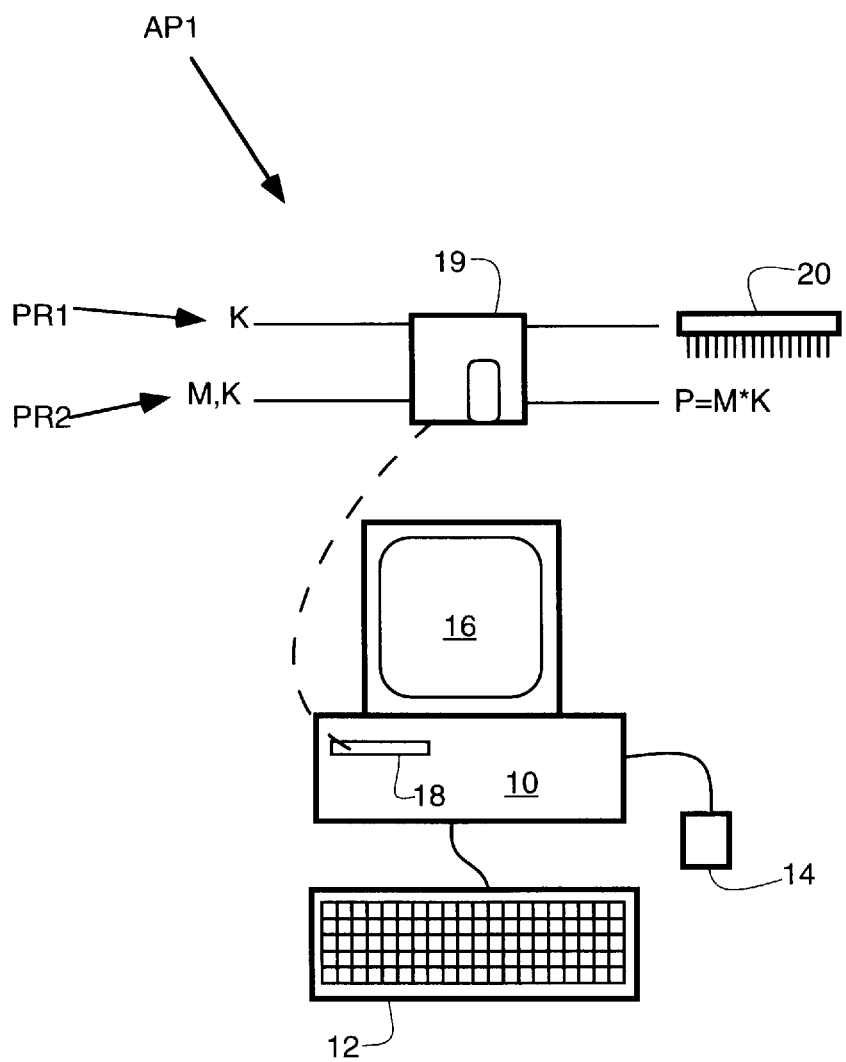
FIG. 1 is a schematic illustration of a computer system incorporating and implementing the present invention.

A computer system AP1 includes a central processing unit (CPU) 10, a keyboard 12, a mouse 14, and a display 16, as shown in FIG. 1. CPU 10 includes plural integrated circuits including a main microprocessor, memory chips, and a digital signal processing chip. In addition, CPU 10 includes a fixed hard drive (not shown) for storing an operating system and a removable media drive 18 for reading from and writing to a removable hard disk 19 including computer-readable media. Removable hard disk 19 stores computer programs including a constant multiplier compiler PR1 and a software DSP program PR2.

DSP program PR2 accepts as inputs a multiplicand M and a multiplier K and yields their product P=M*K. Constant multiplier compiler PR1 accepts a multiplier K as an input and outputs a logical description of a multiplication circuit incorporated in integrated circuit 20, of which the DSP chip within CPU 10 is a copy.

Figure 2:
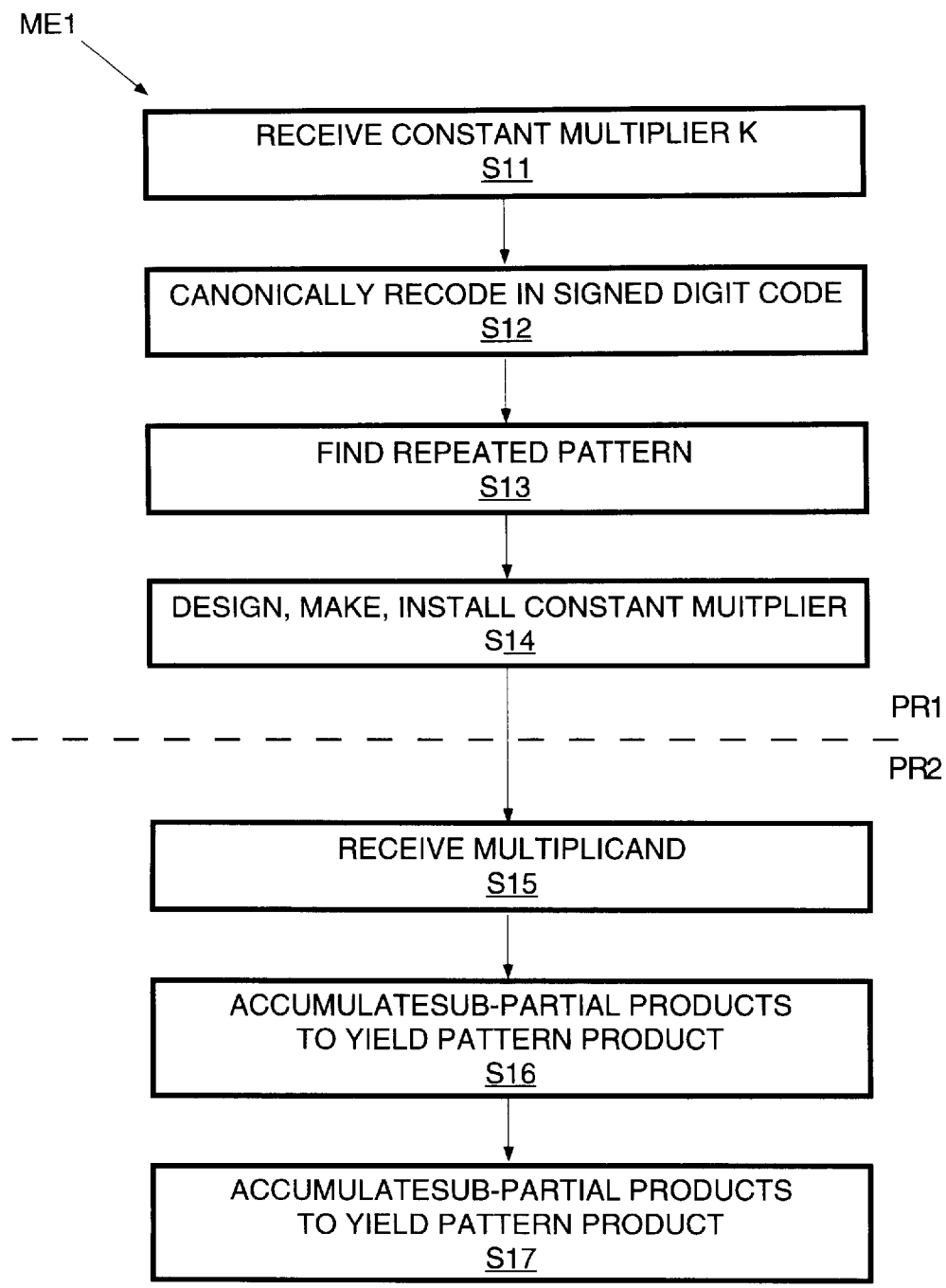
FIG. 2 is a flow chart of a method for designing and using a multiplication circuit in accordance with the present invention.

A method ME1 implemented in computer system AP1 is flow charted in FIG. 2. Method ME1 begins with a step S11 of receiving a multiplier K=935 (base$_{10}$)=1110100111 (unsigned base$_2$)=001110100111 (signed 12-bit base$_2$). Note that the binary expressions include seven non-zero bit positions so that multiplication would require six additions to accumulate the seven partial products.

Step S12 involves canonically recoding K into a minimal signed digit code. Canonical recoding involves right to left recoding according to the following Canonical Recoding table from *Computer Arithmetic Algorithm* by Israel Cohen, Prentice-Hall, Inc., Englewood Cliffs, N.J., 1993, p. 104.

TABLE I

Canonical Recoding

| $x_{i+1}$ | $x_i$ | $c_i$ | $y_i$ | $c_{i+1}$ | comments |
|---|---|---|---|---|---|
| 0 | 0 | 0 | 0 | 0 | string of 0s |
| 0 | 1 | 0 | 1 | 0 | a single 1 |
| 1 | 0 | 0 | 0 | 0 | string of 0s |
| 1 | 1 | 0 | $\bar{1}$ | 1 | beginning of 1s |
| 0 | 0 | 1 | 1 | 0 | end of 1s |
| 0 | 1 | 1 | 0 | 1 | string of 1s |
| 1 | 0 | 1 | $\bar{1}$ | 1 | a single 0 |
| 1 | 1 | 1 | 0 | 1 | string of 1s |

To determine the least significant bit $y_0$ of the minimal signed digit code, the least two significant bits of the binary expression must be considered, in this case they are 11. In addition, a carry bit $c_0$ must be considered; since there is no carry to the least significant digit position, $c_0$=0. Thus, the table entry of interest is 110, which the comment correctly indicates corresponds to the beginning of a string of 1s. This table entry yields $y_0=\bar{1}$ and $c_1=1$.

Thus, $x_2=x_1=c_1=1$. Accordingly, $y_1$ can be found by looking at entry 111, which the comment indicates characterizes the interior of a string of 1s. This entry yields $y_1=0$ and $c_2=1$. Continuing this procedure until the most significant bit of K is processed yields the minimal signed digit code $100\bar{1}0101\bar{0}0\bar{1}$. Note that the number of partial products that must be added or subtracted has been reduced from seven to five, and the number of additions and subtractions required has been reduced from six to four.

Step S13 involves identifying a repeated pattern in the minimal signed digit code with the requirement that the repeated pattern include at least two digit positions with non-zero values. In general, there can be many repeated patterns in an expression. The possibilities to be considered can be narrowed without losing any superior partial product reductions by considering only patterns that begin and end with non-zero values.

In addition, bounds can be determined to limit the search. For a string in which the number n of non-zero values is a power of two, the repeated pattern method cannot reduce the number of operations below $\log_2 n$; this corresponds to two instances of a pattern with two instances of a subpattern with two instances of a sub-sub-pattern, etc. Where the number n of non-zero values is not a power of two, a lower bound can be obtained by rounding up from $\log_2 n$. In general, the smallest integer $I \geq \log_2 n$ can serve as a lower bound. In most cases, a higher lower bound can be determined. In the present example, there are five non-zero values in the signed digit string; the optimal solution is two instances of a pattern with two non-zero values and one remainder, yielding three operations.

Furthermore, no repeated pattern is of interest if utilizing it would not reduce the number of operations. Thus, the number of operations to perform the accumulation of the minimal signed digit code cannot be less than the number of operations needed to generate the pattern plus the number of operations required to accumulate the instances of the pattern and the remainder partial products. In the present case, only repeated patterns that would result in fewer than four binary operations are of interest. Thus, for $100\bar{1}0101\bar{0}0\bar{1}$ both the upper and lower bounds for the optimal solution require three binary operations.

Step 13 begins with a restricted search for an optimal pattern. The restrictions applied are: 1) that the pattern bit positions be contiguous; 2) that the pattern instances be non-overlapping; and 3) that the pattern instances be non-inverted. In the example, these restrictions require a pattern that has a non-zero value at its most significant bit position and a non-zero at its least significant bit position and zeroes in any intermediate bit positions. Where, as in the present case, there are only five non-zero values in the signed digit expression of the multiplier, there are at most four strings that meet this requirement. Since one must be a repeat, only three strings need to be considered as patterns.

The search begins with identifying all patterns that have half as many non-zero bits as there are non-zero bits in the whole string. These patterns are then compared to the string to determine if there is more than one non-overlapping instance of any of them. Matching strings are marked as covered and the search resumes. Once all patterns with a given number of non-zero bits have been exhausted, a search resumes with patterns made up of one fewer non-zero bits. This process repeats until either all of the bits have been marked as covered, only three uncovered bits remain, or all two-bit searches have been exhausted on the remaining uncovered bits.

The identified patterns may then be evaluated to determine if there are any subpatterns within or between the patterns. The larger patterns will be broken down into the subpatterns if it is determined that fewer operations would result from their use. Remaining bits may also be evaluated to see if they fall into any of the subpatterns.

In the example, the two-non-zero-bit pattern $100\bar{1}$ is found to repeat and yields a reduction to three binary operations: one for the two non-zero values per pattern instance, one for the two instances of the pattern, and one for the remainder. Since three is the minimum possible number of operations achievable with five non-zero values in the multiplier, the search stops.

If the fully restricted search fails to find an optimal candidate, successive searches can be conducted in which restrictions are removed. Logical combinations of these restrictions can be used to break the search into small steps. For example, the first iteration can be subject to all three restrictions (contiguity, non-overlap, and non-inversion). The next three iterations each remove a different restriction, while maintaining the other two restrictions. The next three iterations can each maintain a respective one of the restrictions while removing the other two restrictions. A final iteration can remove all three restrictions. The less restricted searches can be very consuming of time and processing power; accordingly, cost versus benefit considerations can dictate that some of the later iterations be skipped.

If the search fails to find a pattern that affords a minimum number of operations, patterns can be searched that would permit the minimum to be exceeded by unity. This second level search would only be conducted if the minimum plus one were less than the total number of operations achieved thus far. Once again, the second level search can begin with restrictions that are removed with successive iterations. Also, some possible optimal patterns can be skipped due to cost versus benefit considerations.

Additional levels of search can proceed until a pattern is found or until the search indicates that no repeated pattern that might be found would yield an initial or further reduction in operation count. The search need not proceed until it is clear that no reduction in operation count is possible. For example, cost versus benefit considerations could dictate that unless a reduction of at least two operations is achievable, it is not worthwhile to perform further pattern seeking.

Note that the invention can be applied to expressions other than signed digit expressions. For the example, in 1110100111 (unsigned binary), the repeated pattern 111 can be identified. Use of the pattern reduces the binary operation count from six to four. The pattern can then be recoded in signed digit format to further reduce the binary operation count to the optimal three. Thus, the order in which repeated patterns are identified and a number is encoded into signed digit code can be reversed.

Once a suitable repeated pattern or combination of repeated patterns is found, it is used to design a constant multiplying system in step S14. In the case of a single pattern, the design can be described by the equation $M*K = M*((P)(F)+R) = (M*P)(F)+(M*R)$, where P is the pattern, R is the remainder, and F is the factor that when multiplied by P yields K less R. In the example, $K=(P)(F)+R=(100\bar{1})(10000001)+100000$. Thus, the equation $M*K=(M*100\bar{1})(10000001)+M*100000$ serves as a general description of a constant multiplier system in which the multiplier is 935=1110100111.

Once the constant multiplier system is designed, it can be manufactured and installed, also at step S14. If the system is to take form in hardware, manufacturing would generally be conducted off line. However, if the hardware were to be implemented in a Field Programmable Gate Array, the manufacturing, installation, and usage could be performed in the computer system in real time. Typically, the installation is not in the computer that designed the multiplier system. However, it is possible for a computer to design a DSP integrated circuit 20 for its own use, and this is the case in the illustrated embodiment In addition, the design is implemented in software by program PR2. Software operating on system AP1 recognizes that a multiplier is to be used a large number of times. As the multiplications are occurring in a generic manner in one thread of a multithreaded process, a constant multiplier system is designed, manufactured and installed in real time. Once installed, it replaces the generic multiplication routine to streamline subsequent multiplications. Step S14 completes the compiler portion of method ME1 implemented by program PR1.

Once installed, the hardware and software embodiments of the constant multiplier system operate in analogous manners. Thus, in step S15, a multiplicand is received by the constant multiplier system. In step S16, sub-partial products are generated and accumulated to yield a pattern product of the multiplicand and the pattern. In cases with multiple (but not nested) patterns, a like number of pattern products are generated.

In step S17, partial products are generated and accumulated to yield the final product. This involves shifting replicas of the pattern product relative to each other to prepare for accumulation. Each instance after the first of the repeated pattern requires only one operation rather than the two or more that would be required for the two or more non-zero values in the pattern. This is where the savings accrue from the present invention. The partial products accumulated in step S17 also include any partial products due to remainders in the multiplier (after pattern instances are subtracted).

Generation of partial products for additional instances of a pattern depends on the generation of a partial product for a first instance of a pattern. Thus, the additional partial products cannot be generated until the first partial product is generated. This imposes a temporal relation between the first and additional partial products associated with instances of the pattern. Depending on the specific implementation, it is possible that generation of the additional partial products can begin before the generation of the first partial product is complete.

If there are additional multipliers, method ME1 returns to step S15. In some embodiments, pipelining is implemented so that a next iteration of step S15 begins before a previous iteration of step S17 ends. If there are no additional multipliers, method ME1 ends.

Figure 3:
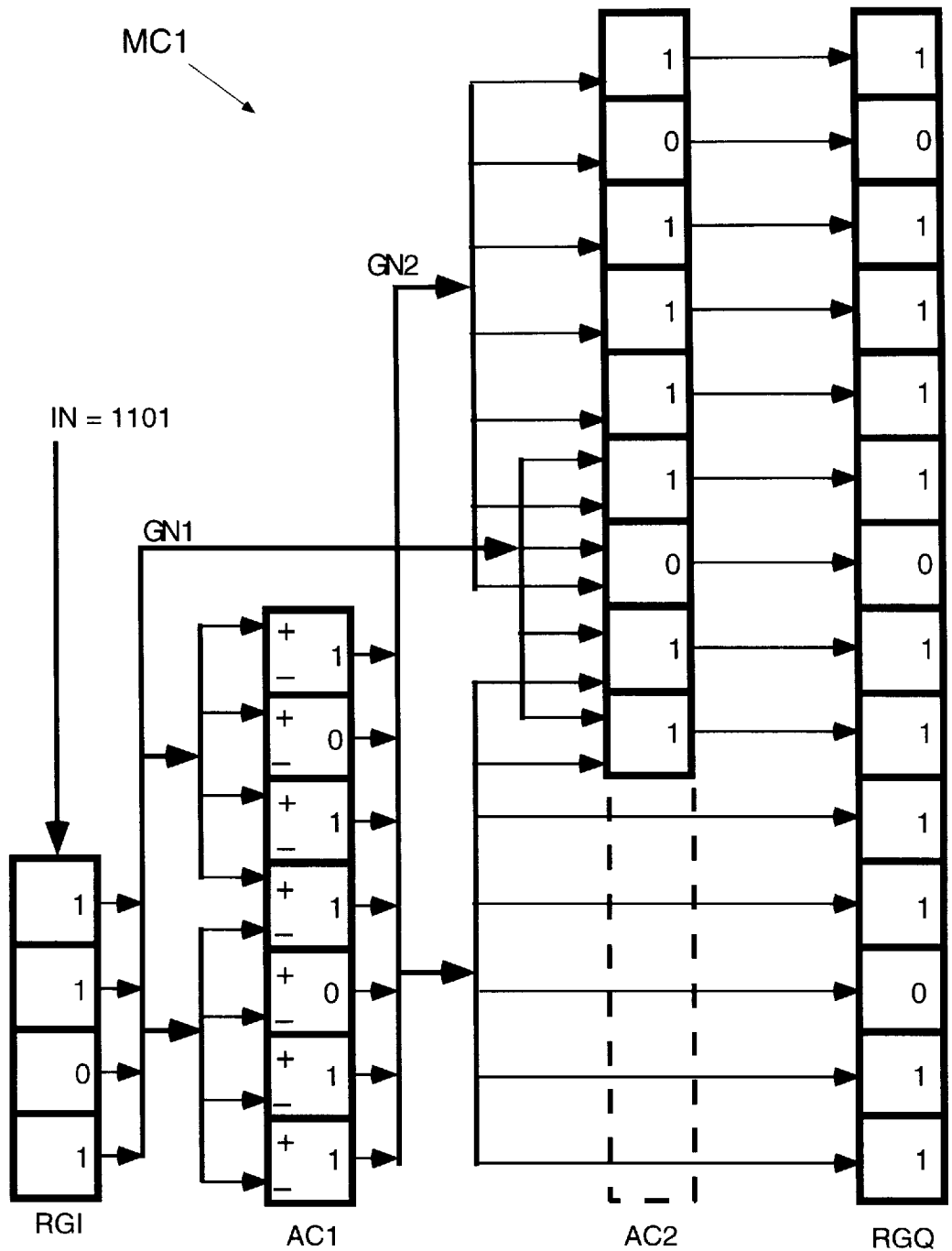
FIG. 3 is a logic diagram of a multiplication circuit in accordance with the present invention.

Method ME1 yields a design for a constant multiplier MC1, shown in FIG. 3. Constant multiplier MC1 is implemented in hardware in copies of integrated circuit 20 and in software in program PR2. The software version has a structure analogous to the hardware version, so the following disclosure enables that embodiment as well.

Input register RG1 receives and stores an unsigned binary 4-bit multiplicand, e.g., 1101. Other embodiments provide for signed values and values with greater precision. The modifications to accommodate multiplicands of greater precision is well within the ken of those skilled in the art. For a signed multiplicand, the sign bit can be passed through to the end result, since in this case the multiplier is positive.

Two replicas of the multiplicand stored in input register RG1 are output to a first accumulator AC1. The input routing GN1 of first accumulator AC1 determines the relative shift of the two multiplicand replicas, and thus serves as the means for generating two sub-partial products corresponding to the two non-zero values in the pattern $100\bar{1}$. Accumulator AC1 serves to subtract the less significant replica corresponding to the $\bar{1}$ in the pattern from the more significant replica corresponding to the 1 in the pattern. To this end, accumulator AC1 is depicted functionally as a bank of subtract elements. Herein, accumulator inputs that are illustrated as unconnected are connected to a logic low level.

However, simple (full) subtracters generate borrows that can take time to ripple the length of the first partial product generated by accumulator AC1. To reduce the time required for multiplying, accumulator AC1 employs a series of logic assemblies designed to limit borrow rippling. For example, the "logic" for the least significant bit is simply a pass through. For each of the next two least significant bits, an inverter is used generate an input that is the opposite of the input. For the fourth least significant bit, all four least significant bits are used by the associated logic to determine whether or not a borrow is required so that an appropriate result is achieved. Likewise, suitable multi-input logic is provided for the four most significant bits.

The output of accumulator AC1 is fed to a second accumulator AC2 by its input routing GN2. Routing GN2 shifts replicas of the first partial product seven bits relative to each other. The direction of the shift is not important since the replicas are to be added. Routing GN2 can be considered as generating a second partial product corresponding to a second instance of the repeated pattern. In addition, accumulator AC2 receives from input register RG1 via routing GN1 a third replica of the multiplicand corresponding to the remainder "1" in the middle of the multiplier. This third replica is a third partial product.

Accumulator AC2 adds the three partial products, and thus is functionally depicted as a bank of full adders. However, the actual logic is designed to limit carry ripple to minimize the latency required by the multiplication. Those skilled in the art can recognize that there are many ways to design an adder circuit that limits carry ripple. The alternatives vary in the circuit area and complexity required and the speed at which the addition is completed. An obvious choice is to simply pass through the five least significant bits, as indicated in FIG. 3. The fourteen bit result 10111101111011 (unsigned binary) is stored in output register RGQ.

As indicated above, in many cases, longer multiplicands are to be multiplied. Obviously, the registers and accumulators need to be able to handle more digit positions than the registers and accumulator of the preferred embodiment. The other major change is that there will tend to be more overlap among shifted versions of the multiplicand. Thus, the accumulator logic will be more complex. It is still within the ken of those skilled in the art to design the logic. However, the tradeoff between speed and area becomes more significant.

Likewise, longer multipliers are often required. With longer multipliers, there tend to be more repeated patterns so more replicas of a repeated pattern must be generated. It is more likely that there are plural repeated patterns, which adds complexity. Also, like longer multiplicands, longer multipliers imply more overlap at the accumulator inputs. Thus, the accumulator logic is more complex. In addition, pattern searching becomes more cumbersome. Therefore, time constraints are more likely to exclude some searches.

Other than differences due to the length of the multiplicand and the multiplier, there are differences due to the types of repeated patterns and remainders. The main example was of a contiguous pattern with two uninverted and nonoverlapping instances and with a single remainder digit. If the middle "1" were changed to a "0", to yield a signed digit multiplicand $100\bar{1}000100\bar{1}$, there will be no remainder digit. Thus, in comparison to system MS1 of FIG. 3, there is no direct connection between the input register and the second accumulator. There will be one fewer partial product, one fewer simple-arithmetic operation, and a resulting simplification of the logic of the second accumulator. Accordingly, some gain in area reduction or speed is obtainable.

Where the signed digit expression of the multiplier takes the form $110\bar{1}000100\bar{1}$, the remainder is within the more significant instance of the pattern (rather than between pattern instances). Clearly, this shift in the remainder position does not greatly affect the gain to be achieved by employing the present invention. However, if only contiguous patterns were applied, this saving would not be realized. The repeated pattern is $1\text{-}0\bar{1}$, which is noncontiguous. Permitting noncontiguous patterns complicates the search for repeated patterns, but poses no special multiplier design challenges. Clearly, noncontiguous patterns should be searched where optimal design is important and search time is not overly constrained. In the present case, the number of simple-arithmetic operations is reduced from four to three.

Another important case takes the form $10\bar{1}00\bar{1}01$. In this case, the pattern $10\bar{1}$, occurs twice, but is inverted in the less significant instance. In this case, the second accumulator must provide for subtraction of the two replicas of the first partial product. The reduction in the number of simple-arithmetic operation is from three to two.

In a related case, the multiplier takes the form $10\bar{1}01$. In this case, one can find two instances of the pattern $10\bar{1}$, but the less significant instance is inverted and its leading non-zero value has the same digit position as the trailing non-zero value of the more significant instance. In this case, the equivalent pattern expression is $M^* \, 10\bar{1}01 = (M^*10\bar{1})(10\bar{1}) + (M^* \, \bar{1}00)$. In this case, the overlap creates an overlap-type remainder which must be subtracted at the second accumulator. While the recoding into repeating patterns does not yield a reduction in simple-arithmetic operations in this example, it can with patterns with more non-zero values and/or instances.

In $10\bar{1}010\bar{1}00\bar{1}0\bar{1}0\bar{1}$, the pattern $10\bar{1}010\bar{1}$ appears twice. Within the pattern, the subpattern $10\bar{1}$, appears twice. The invention provides for substages in the pattern-product stage accumulator in a case like this. In the first substage, a sub-partial product corresponding to the subpattern is accumulated. In the second substage, shifted replicas of the sub-partial product are accumulated to yield a pattern product which serves as partial product for the final-product accumulator. In this case, the number of simple-arithmetic operations is reduced from seven to three. This solution is optimal in that the lower bound $\log_2 8 = 3$ is achieved. An alternative is to apply one level of the $10\bar{1}$ pattern four times. However the reduction is only to four operations in this case.

In $10\bar{1}000\bar{1}0\bar{1}0000100\bar{1}0000100\bar{1}$, there are two repeated patterns, $10\bar{1}$ and $100\bar{1}$. In this case, partial products for one instance of each pattern are generated in parallel at a first accumulator level. Each first partial product can be shifted and all four resulting partial products can be accumulated at a second accumulator level, reducing the number of simple-arithmetic operations from seven to five.

In other multipliers, other combinations of the foregoing pattern types can be found. Those skilled in the art can apply the foregoing teachings to design associated multiplier systems.

An alternative pattern search method uses factoring rather than pattern shifting. A multiplier can be factored in all ways possible and the factors canonically encoded to signed digit notation. An operation count for each factoring can be obtained by subtracting the number of factors from the total number of non zero digits in the factors. This count can be compared with the operation count for the unfactored multiplier, and the most favorable case selected. In general, the expression with the lowest count having the fewest factors is the most favorable. Fewer factors are preferred to minimize the number of stage delays in the multiplier system.

The factoring approach can be iterated to provide for factoring with remainders if the "no remainder" iteration fails to exclude the possibility of a better solution that includes remainders. The first iteration can permit one remainder. In other words, each possible power of two can be added and subtracted from the multiplier and the result can be factored as above. However, unity must be added to the operation count expression. If the earlier iterations do not exclude better solutions with more remainders, additional iterations can be conducted.

In each case, all combinations of positive and negative remainders should be considered. Eventually, the search iterations end because adding another remainder would make it impossible to improve upon the original multiplier expression or a previously found factoring.

When the factors are found, one factor can arbitrarily be identified as the pattern, and the foregoing design method applied to design a compiler system. If there are more than two factors, subpatterns exist and the pattern accumulator stage will have substages.

The factoring search method appears more effective at finding complex patterns than is the pattern shifting search method. A weakness of the factoring search method is that it is less able to find multiple patterns in the presence of remainders than is the pattern shifting search method. However, a combination of the shifting and factoring methods can be used at some cost in complexity to obtain the advantages of each.

Additionally, in cases where trinary operations (e.g., a three input adder) are possible, this invention could be employed to reduce the number of trinary operations. Accordingly, quaternary operations and beyond may be supported, as well as combinations of these different sized operations. These and other modification to and variations upon the illustrated embodiments are within the scope of the present invention as defined by the following claims.

What is claimed is:

1. A computer-readable memory for causing a computer to generate a description of a digital constant multiplication system for multiplying multiplicands by a constant multiplier expressible as a string of digits having plural instances of a pattern with at least two digit positions thereof having non-zero values, said memory comprising:

a computer-readable storage medium; and
   a computer program stored in said storage medium, said computer program having an interface for receiving said multiplier, said computer program identifying in said multiplier said instances of said pattern, said computer program further generating a description of a multiplication system having
      input means for receiving a multiplicand,
      a pattern-product accumulator for generating multiplicand replicas of said multiplicand shifted relative to each other and for accumulating said multiplicand replicas to yield a pattern product of said pattern and said multiplicand, said pattern product accumulator being coupled to said input means for receiving said multiplicand, and
      a final-product accumulator for accumulating partial products to yield a final product of said multiplicand and said multiplier, said final-product accumulator replicating said pattern product to provide pattern-product replicas shifted relative to each other, said partial products including said pattern-product replicas, said final-product accumulator being coupled to said pattern-product accumulator to receive said pattern product.

2. A computer-readable memory as recited in claim 1 wherein said computer program further identifies non-zero remainder values corresponding to non-zero values in the difference obtained by subtracting said instances from said multiplier, said computer program further generating said description so that said final-product accumulator is coupled to said input means for receiving said multiplicand, said final-product accumulator generating a remainder replica of said multiplicand corresponding to said non-zero remainder value, said partial products including said remainder replica.

3. A computer-readable memory as recited in claim 2 wherein said pattern-product accumulator further generates one or more additional pattern products corresponding to patterns in said multiplier and said final-product accumulator generates replicas of each of said additional pattern-products.

4. In a digital data processing system, a constant multiplier system for multiplying multiplicands by a multiplier expressible as a string of digits having plural instances of a pattern with at least two digit positions thereof having non-zero values, said system comprising:

input means for receiving a multiplicand;
   a pattern-product accumulator for generating multiplicand replicas of said multiplicand shifted relative to each other and for accumulating said multiplicand replicas to yield a pattern product of said pattern and said multiplicand, said pattern product accumulator being coupled to said input means for receiving said multiplicand; and
   a final-product accumulator for accumulating a partial-product set of partial products to yield a final product of said multiplicand and said multiplier, said final-product accumulator replicating said pattern product to provide pattern-product replicas shifted relative to each other, said partial-product set including said pattern-product replicas, said final-product accumulator being coupled to said pattern-product accumulator to receive said pattern product.

5. A constant multiplier system as recited in claim 4 wherein said final-product accumulator is coupled to said input means for receiving said multiplicand therefrom, said final-product accumulator generating a remainder replica of said multiplicand corresponding to a non-zero value in the difference obtained by subtracting said instances of said pattern from said multiplier, said partial-product set including said remainder replica.

6. A constant multiplier system as recited in claim 5 wherein said pattern-product accumulator further generates one or more additional pattern products corresponding to patterns in said multiplier and said final-product accumulator generates replicas of each of said additional pattern-products.

7. A method of multiplying a multiplicand by a constant multiplier in a computer system, said method comprising the steps of:

determining a pattern for which there are multiple instances in said constant multiplier, said pattern having at least two digit positions with non-zero values;
   calculating a pattern product of said multiplicand and said pattern;

replicating said pattern product to provide plural replicas of said pattern product shifted relative to each other; and accumulating partial products including said replicas of said pattern product to yield a final product of said multiplicand and said multiplier.

8. A method as recited in claim 7 further comprising a step of generating a remainder replica of said multiplicand corresponding to the product of said multiplicand and a non-zero value in the difference obtained by subtracting said instances of said pattern from said multiplier, said partial-products including said remainder replica.

9. A method as recited in claim 7 wherein said determining step involves determining plural pattern products corresponding to plural patterns represented in said multiplier, said replicating step involving replicating each of said plural pattern products.

\* \* \* \* \*